Nov. 29, 1966 W. E. SCHMIDT ETAL 3,288,404
ENGINE MOUNTING SYSTEM
Filed Aug. 24, 1964 3 Sheets-Sheet 2
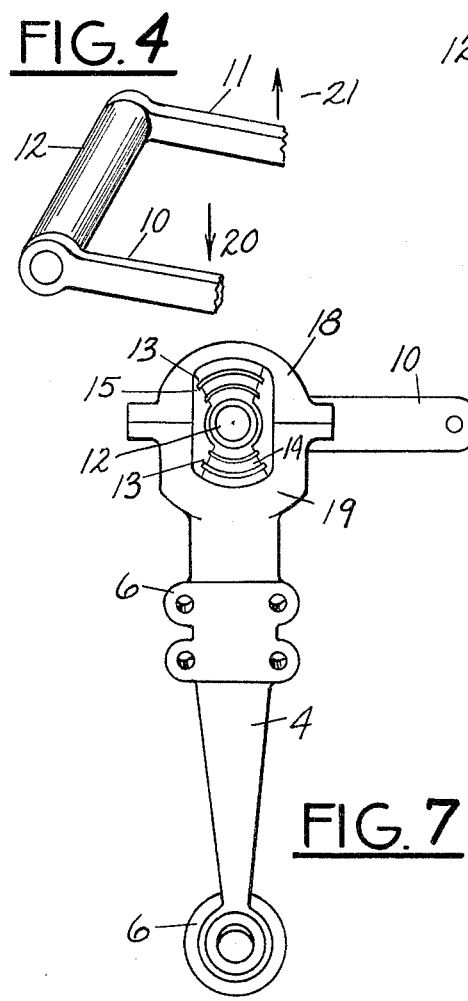
FIG. 4
FIG. 7
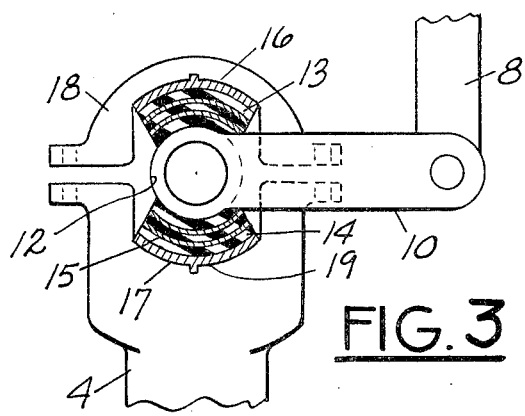
FIG. 3
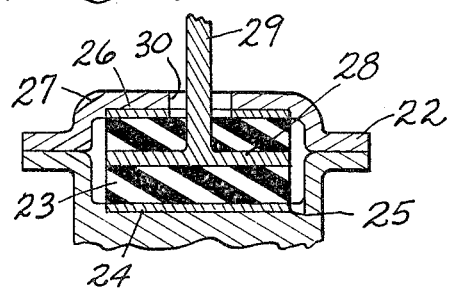
FIG. 2
Warren E Schmidt
Philip R Woodford
John H Cornett
INVENTORS
BY Ralph Hammar
Attorney Warren E. Schmidt
Philip R. Woodford
John H. Goudt
INVENTORS BY Ralph Hammar
Attorney

United States Patent Office 3,288,404
Patented Nov. 29, 1966

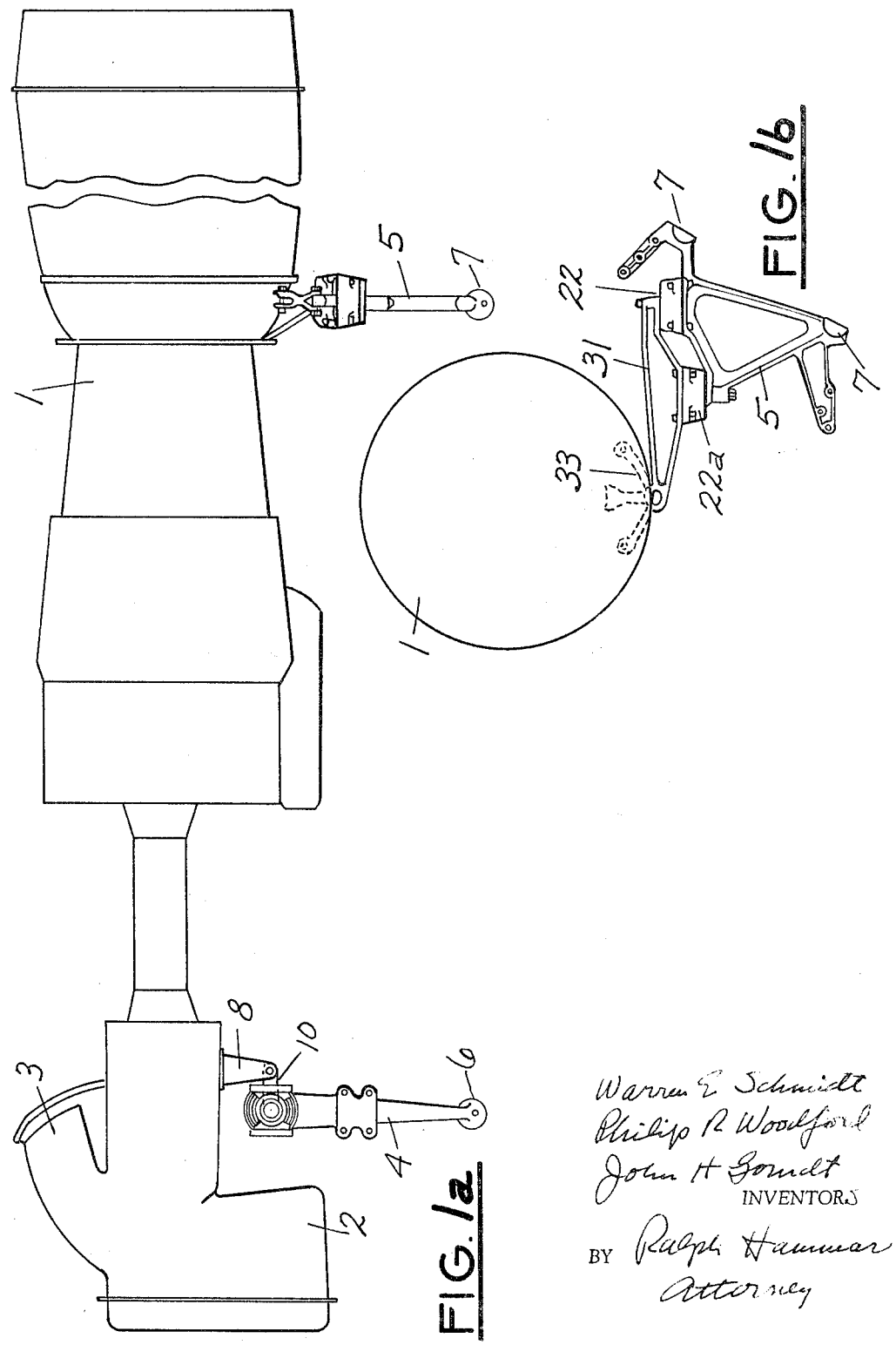

3,288,404
ENGINE MOUNTING SYSTEM
Warren E. Schmidt, Philip R. Woodford, and John H. Gorndt, Erie, Pa., assignors to Lord Corporation, a corporation of Pennsylvania
Filed Aug. 24, 1964, Ser. No. 391,635
12 Claims. (Cl. 248—5)

This invention is an engine mounting system which provides longitudinal, vertical and lateral isolation and restrains rotational motion of the engine.

Figure 5:
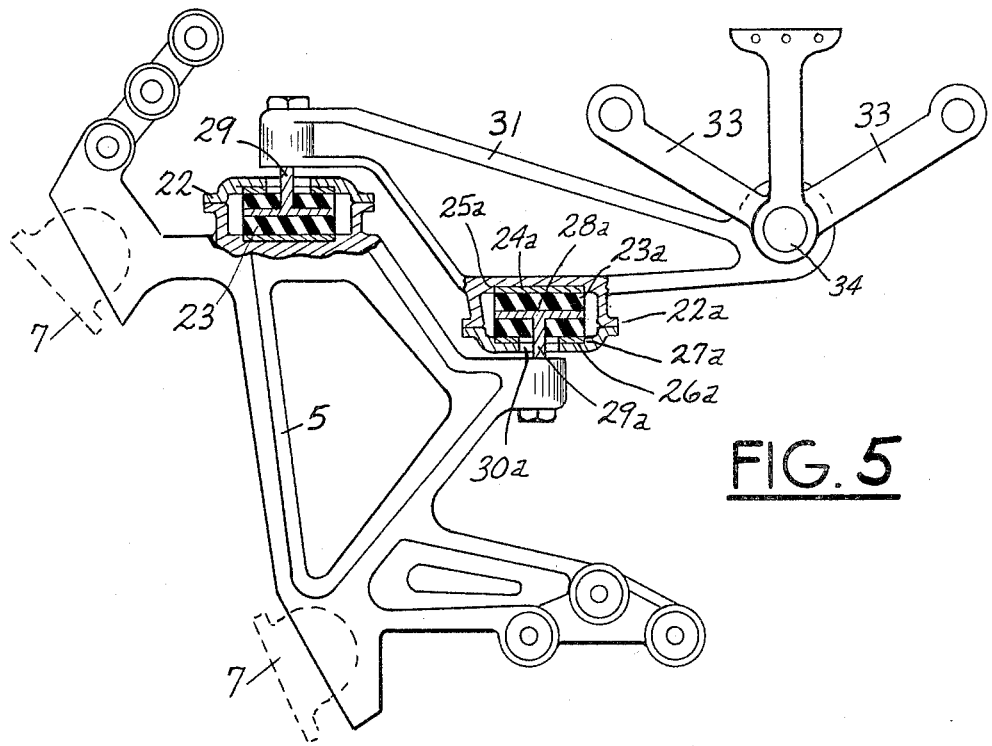
Figure 6:
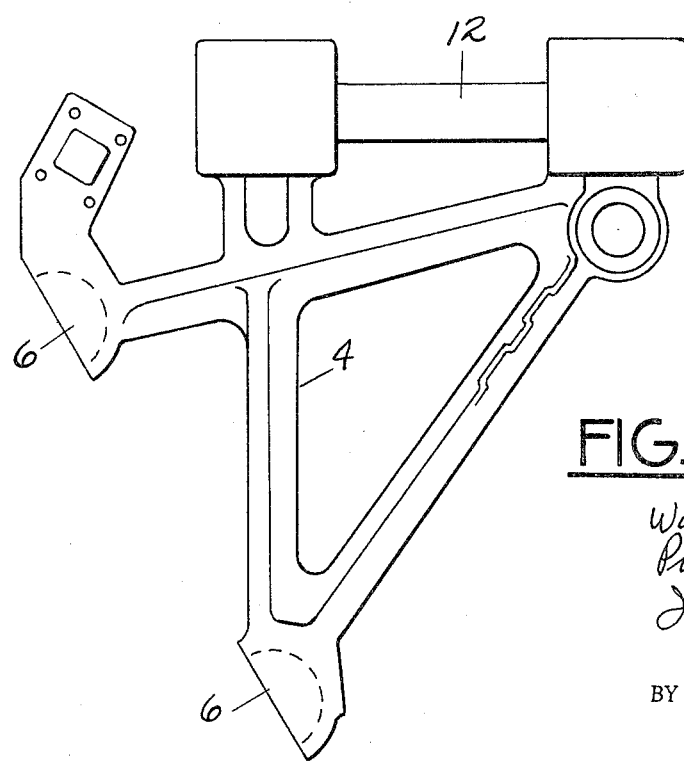

In the drawing, FIG. 1a is a side elevation of a mounting system for a turbo-shaft engine for driving a helicopter rotor or a propeller, FIG. 1b is a rear view of the mounting system, FIG. 2 is a section through one of the rear mountings, FIG. 3 is a section through one of the front mountings, FIG. 4 is a diagrammatic view illustrating the effect of torque, FIG. 5 is an elevation of the rear supporting bracket, FIG. 6 is an elevation of the front supporting bracket, and FIG. 7 is an end view of the front supporting bracket.

In the drawing, 1 indicates diagramatically a gas turbine, 2 indicates the gear case, and 3 indicates the drive shaft housing. The particular application is for a helicopter rotor drive where there is one engine on each side of the fuselage and the drive shafts of the individual engines extend at an angle to a common drive for the rotor. That is the reason for the angular relation of the drive shaft housing to the gear case in FIG. 1. In other applications, such as turbo-prop drives, the drive shaft housing 3 could be differently located.

The engine and its gear case comprise a unitary structure which is carried by a front bracket 4 and a rear bracket 5, respectively provided with mounting pads 6, 7 for attachment to the air frame. Because the engine and its transmission are a unitary assembly, the assembly will hereafter be referred to as the engine assembly. The pads 6, 7 are offset laterally from the engine assembly. The air frame and engine assembly are supporting and supported members.

The front of the engine assembly has a suspension which is rigid in torsion about the longitudinal axis of installation and soft in translation, vertical and lateral. This comprises depending brackets 8, 9 on the gear case attached to crank arms 10, 11 respectively fixed to opposite ends of a torque tube 12 transverse to the longitudinal axis of the engine. The crank arms extend along and are on opposite sides of the longitudinal axis of the engine. Between each end of the torque tube and the bracket 4 is a resilient mounting shown in FIG. 3 which is stiff in vertical directions and is soft in torsion and in horizontal directions. The load applied by the weight of the engine assembly to the crank arms 10, 11 acts downward at the outer ends of both crank arms and applies a torisional force in the same direction to both ends of the torque tube 12. Opposite ends of the torque tube are bonded to the inner surface of bodies 13, 14 of a suitable elastomer which may have several arcuate shims 15 bonded therein to prevent bulging of the elastomer under compression loads. The outer ends of the bodies 13, 14 are bonded to arcuate end plates 16, 17, the end plate 16 being keyed to a cap 18 and the end plate 17 being keyed to a socket 19 in the bracket 4. FIG. 3 shows the end cap 18 in readiness for bolting to the socket 19. Under torsion, the bodies 13, 14 are stressed in shear and provide a relatively soft mounting. In addition to being soft in torsion, the bodies 13, 14 are soft in horizontal directions both endwise and crosswise of the tube 12. If softness in a horizontal direction crosswise of the tube were not desired, the bodies 13, 14 could be replaced by a single tubular body and the front mountings would then be tube form mountings. Instead of the FIG. 3 mounting, other mountings can be used whose principal axis of greatest stiffness is in a vertical direction.

Under externally applied torque loads, such as originate in the propeller or rotor, the engine assembly is subjected to a torque about its longitudinal axis which at any instant may be represented by the arrow 20 applied to the outer end of crank arm 10 and by the arrow 21 applied to the outer end of crank arm 11. The forces in the directions of arrows 20, 21 tend to twist the torque tube 12 which is made stiff enough to withstand the forces. The stiffness of the torque tube 12 does not interfere with the support of the engine assembly. The forces in the directions of arrows 20, 21 also tend to lift the torque tube 12 at one end and to depress it at the other, thereby stressing the bodies 13, 14 in compression (direct stress), a direction in which the bodies are inherently stiff. The stiffness in compression is controlled by the number of shims 15 bonded into the elastomer. Under the torque loads, the torque tube 12 is in series with the compression loaded elastomeric bodies 13, 14 providing a rigid restraint which limits the angular excursion of the drive shaft. This is important in aircraft engines where the torque load to the engine drive shaft from the propellers may apply forces to the engine mountings of ten or more times the engine weight. If the engine were mounted on a torsionally soft suspension, such torque loads could cause prohibitive excursion.

The rear of the engine assembly is carried by two substantially identical shear sandwich mountings 22 and 22a. The resilient mounting 22 as shown in FIG. 2 comprises a body 23 of elastomer having its lower surface bonded to a circular plate 24 seated in a socket 25 integral with the bracket 5 and having its upper surface bonded to an annular washer 26 seated in a cap plate 27 secured to the socket 25. At the center of the body 23 is bonded a core 28 having a stem 29 extending out through an opening 30 in the cap plate 27. The stem 29 of the mounting 22 is fixed to one end of a lever 31 having its opposite end connected to the engine 1 by struts 33 extending from ball joint 34 beneath the engine centerline. The resilient mounting 22a comprises a body 23a of elastomer having its upper surface bonded to a circular plate 24a seated in a socket 25a integral with an intermediate portion of the lever 31 and having its lower surface bonded to an annular washer 26a seated in a cap plate 27a secured to the socket 25a. At the center of the body is bonded a core 28a having a stem 29a extending out through an opening 30a in the cap plate 27a. The stem 29a is fixed to the bracket 5.

The combination of the mountings 22, 22a and the lever 31 provides an effective support for the engine 1 directly beneath its centerline and with equal spring rates in any direction perpendicular to the longitudinal axis of the engine. The lever 31 acts as a cantilever and as a motion multiplier to project the effective engine support out from the mounting pads 7. The lever 31 also acts as a motion multiplier to get a soft vertical spring rate at the effective support from mountings 22, 22a which are stiff in compression. The mountings 22, 22a are stressed in shear by lateral or horizontal loads providing the required soft suspension for horizontal vibrations. The rear mounting system 22, 22a, 31 avoids coupling of the vertical and lateral modes of vibration and makes possible equal spring rates in all directions radial to the longitudinal axis of the engine.

The rear mounting is useful in installations where natural frequency and stability requirements establish a need for an effective spring rate at a point remote from the area where the isolator mountings themselves must be placed. In the illustrated system, equal spring rates in any direction perpendicular to the longitudinal axis of the engine were required at a ball joint attachment directly under the engine centerline. Normally this would be accomplished by locating a mounting sandwich directly under the ball joint or equally spaced on opposite sides of it. However, structural requirements demanded laterally displaced positions for the mounting and for this situation customary practice has been to use focalized sandwich mountings to project the elastic center over to the ball joint. Calculations prove that such an arrangement could not possibly have the required equal spring rates. Furthermore, a vertical load produced both vertical and lateral motion at the ball joint, resulting in undesirable coupling of vertical and lateral modes of vibration.

This dilemma was solved by using the lever arm 31 not only as a cantilever for projecting support out to the ball joint 34 but also as a motion multiplier to get a low vertical spring rate at the ball joint 34 with high compression spring rate mountings 22, 22a. Laterally, the low shear spring rates of the sandwiches are balanced so that their elastic center is essentially at the height of the ball joint, producing an uncoupled lateral mode. A vertical load produces only vertical motion, producing an uncoupled vertical mode. The structure provides a mounting system having equal spring rates in all radial directions from the remote ball joint.

What is claimed as new is:

1. A mounting system comprising an engine, a horizontal torsion member transverse to an axis of the engine, crank arms transverse to the axis of the torsion member and spaced from each other along the length of the torsion member, each crank arm having one end fixed to the torsion member and having its other end connected in load carrying relation to the engine, said crank arms extending along and being on opposite sides of the longitudinal axis of the engine, a resilient mounting at each end of the torsion member, said mounting having opposed surfaces extending generally in the same direction as the torsional member and a body of elastomer between and anchored to said surfaces and sustaining vertical loads in direct stress and horizontal and torsional loads in shear.

2. The mounting system of claim 1 in which said opposed surfaces are arcuate about the axis of the torsion member.

3. The mounting system of claim 1 in which the torsion member is a torque tube.

4. A mounting system comprising an engine having a drive shaft, a torsion member transverse to the drive shaft, crank arms transverse to the axis of the torsion member and spaced from each other along the length of the torsion member, each crank arm having one end fixed to the torsion member and having its other end connected in load carrying relation to the engine, said crank arms extending along and being on opposite sides of the longitudinal axis of the engine, a resilient mounting at each end of the torsion member, said mounting having opposed surfaces extending generally in the same direction as the torsional member and a body of elastomer between and anchored to said surfaces and sustaining vertical loads in direct stress and horizontal and torsional loads in shear, and resilient means supporting the other end of the engine.

5. A mounting system comprising an engine, a torsion member transverse to an axis of the engine, crank arms transverse to the axis of the torsion member and spaced from each other along the length of the torsion member, each crank arm having one end fixed to the torsion member and having its other end in load carrying relation to the engine, and said crank arms extending along and being on opposite sides of the longitudinal axis of the engine, a resilient mounting at each end of the torsion member, each mounting having a plurality of principal axes along which it has different spring rates and each mounting having its principal axis of greatest stiffness in a vertical direction.

6. A mounting system comprising an engine having a drive shaft, a torsion member at one end of the engine transverse to the longitudinal axis of the engine, crank arms transverse to the axis of the torsion member and spaced from each other along the length of the torsion member, each crank arm having one end fixed to the torsion member and having its other end connected in load carrying relation to the engine, a resilient mounting at each end of the torsion member, said mounting having opposed generally horizontally extending surfaces and a body of elastomer between and anchored to said surfaces and sustaining vertical loads in direct stress and horizontal and torsional loads in shear, a pair of resilient mountings at the other end of the engine, said mountings each having a plurality of principal axes along which the respective mountings have different spring rates and each mounting having its principal axis of greatest stiffness in a vertical direction, a lever having one end and an intermediate portion respectively connected in load carrying relation to one and the other of said pair of mountings and having its other end connected in load carrying relation to said other end of the engine.

7. A mounting system comprising an engine, a bracket having pads adapted to be attached to an air frame and having a pair of sockets, a cap fixed to each socket, a torsion member transverse to an axis of the engine having fixed at its ends a body of elastomer between each end of the torsion member and the socket and associated cap, said bodies having principal axes of greatest stiffness in a vertical direction, and spaced crank arms fixed at one end to the member and having free ends connected in load carrying relation to the engine.

8. A mounting system comprising an engine, a horizontal torsion member transverse to an axis of the engine, spaced crank arms fixed to the torsion member and having free ends connected in load carrying relation to the engine, a bracket having pads adapted to be attached to an air frame and having a pair of upwardly presented sockets on opposite sides of the axis of the engine, a cap fixed to each socket, a pair of resilient mountings at each end of the torsion member, each mounting having opposed surfaces extending generally in the same direction as the torsional member, one surface of each pair being on the torsion member and the other surface of each pair being respectively on the socket and on the cap, a body of elastomer between and anchored to each pair of surfaces and sustaining vertical loads in direct stress and horizontal and torsional loads in shear.

9. A mounting system comprising an engine, a horizontal torsion member at one end of the engine transverse to the longitudinal axis of the engine, crank arms fixed to spaced portions of the torsion member and having free ends connected in load carrying relation to the engine, a resilient mounting at each end of the torsion member, said mountings having opposed surfaces extending generally in the same direction as the torsional member and a body of elastomer between and anchored to said surfaces and sustaining vertical loads in direct stress and horizontal and torsional loads in shear, a lever transverse to the longitudinal axis and at the other end of the engine, a load carrying connection from the engine to one end of the lever, a resilient mounting connected in supporting relation to the other end of the lever, another resilient mounting connected in supporting relation to an intermediate portion of the lever, said mountings each having opposed generally horizontally extending surfaces and a body of elastomer between and anchored to said surfaces.

10. A mounting system comprising supporting and supported members laterally spaced from each other, a lever, a load carrying connection from one end of the lever to one of the members, a resilient mounting connected to the other member in supporting relation to the other end of the lever, another resilient mounting connected to the other member in supporting relation to an intermediate portion of the lever, said mountings each having opposed generally horizontally extending surfaces and a body of elastomer between and anchored to said surfaces.

11. A mounting system comprising an engine, a bracket having pads adapted to be attached to an air frame, a lever projecting from the air frame, a load carrying connection from the engine to the end of the lever remote from the air frame, a resilient mounting connected in supporting relation to the other end of the lever, another resilient mounting connected in supporting relation to an intermediate portion of the lever, said mountings each having opposed generally horizontally extending surfaces and a body of elastomer between and anchored to said surfaces.

12. A mounting system comprising a supporting member, a lever projecting laterally from the supporting member, a supported member spaced laterally from the supporting member, a load carrying connection from the supported member to the projecting end of the lever, shear sandwich resilient mountings arranged to sustain vertical load in compression and horizontal load in shear, one of the mountings being connected between the other end of the lever and the supporting member and another of the mountings being connected between an intermediate portion of the lever and the supporting member, said mountings being balanced so their elastic center is substantially in a horizontal plane through said load carrying connection producing an uncoupled lateral mode.

References Cited by the Examiner
UNITED STATES PATENTS

| | | | |
|---|---|---|---|
| 888,535 | 5/1908 | Royce | 248—6 X |
| 2,028,549 | 1/1936 | Lord | 287—7 |
| 2,241,026 | 5/1941 | Wylie | 248—9 |
| 3,042,349 | 7/1962 | Pirtle et al. | 248—5 |

CLAUDE A. LE ROY, *Primary Examiner.*

JOHN PETO, *Assistant Examiner.*